(12) United States Patent
Hansen et al.

(10) Patent No.: US 9,091,451 B2
(45) Date of Patent: Jul. 28, 2015

(54) MODULAR HEATING, VENTILATING, AIR CONDITIONING, AND REFRIGERATION SYSTEMS AND METHODS

(75) Inventors: Richard L. Hansen, Parrish, FL (US); Benjamin Eric Newell, Urbana, IL (US); Ty Allan Newell, Urbana, IL (US); Alexander Yemma Long, Champaign, IL (US)

(73) Assignee: HOBART BROTHERS COMPANY, Troy, OH (US)

( * ) Notice: Subject to any disclaimer, the term of this patent is extended or adjusted under 35 U.S.C. 154(b) by 1160 days.

(21) Appl. No.: 12/751,932

(22) Filed: Mar. 31, 2010

(65) Prior Publication Data

US 2010/0307178 A1 Dec. 9, 2010

Related U.S. Application Data

(60) Provisional application No. 61/184,470, filed on Jun. 5, 2009.

(51) Int. Cl.
*F24F 1/04* (2011.01)
*F24F 1/02* (2011.01)
*B64F 1/36* (2006.01)
*F24F 11/00* (2006.01)

(52) U.S. Cl.
CPC ............... *F24F 1/025* (2013.01); *B64F 1/364* (2013.01); *F24F 2011/0067* (2013.01); *F24F 2221/36* (2013.01)

(58) Field of Classification Search
CPC .......... F24F 1/02; F24F 1/022; F24F 2221/36
USPC ............. 62/77, 175, 298, 335, 434, 186, 404, 62/407, 413, 203
See application file for complete search history.

(56) References Cited

U.S. PATENT DOCUMENTS

| 2,349,683 | A | | 5/1944 | Sperry |
| 2,894,375 | A | | 7/1959 | Waterfill |
| 2,943,455 | A | | 7/1960 | Reverman |
| 4,852,362 | A | * | 8/1989 | Conry ............................ 62/175 |
| 5,031,690 | A | | 7/1991 | Anderson et al. |
| 5,383,335 | A | * | 1/1995 | Anderson et al. ................. 62/89 |
| 5,551,508 | A | | 9/1996 | Lim et al. |
| 6,240,742 | B1 | * | 6/2001 | Kaufman et al. ............... 62/480 |

(Continued)

FOREIGN PATENT DOCUMENTS

| CN | 2177187 | 9/1994 |
| CN | 101005987 | 7/2007 |

(Continued)

OTHER PUBLICATIONS

International Search Report for application No. PCT/US2010/035950 mailed Oct. 27, 2010.

(Continued)

*Primary Examiner* — Jonathan Bradford
(74) *Attorney, Agent, or Firm* — Fletcher Yoder P.C.

(57) ABSTRACT

A modular air conditioning (AC) system including one or more AC modules is provided. The AC modules may be adapted to function individually or cooperatively as part of a modular system. The AC modules may be further adapted to connect in a variety of advantageous ways to facilitate the supply of conditioned air to a variety of downstream applications.

20 Claims, 5 Drawing Sheets

(56) References Cited

U.S. PATENT DOCUMENTS

| | | | |
|---|---|---|---|
| 6,460,356 B1 * | 10/2002 | Tao et al. | 62/175 |
| 6,491,094 B2 | 12/2002 | Rayburn | |
| 6,662,590 B2 | 12/2003 | Kamuf | |
| 6,755,035 B1 | 6/2004 | McNamara | |
| 6,763,669 B1 * | 7/2004 | Bushnell et al. | 62/115 |
| 6,819,563 B1 | 11/2004 | Chu | |
| 6,988,538 B2 | 1/2006 | Merkys et al. | |
| 7,461,516 B2 | 12/2008 | Leadingham | |
| 8,331,086 B1 * | 12/2012 | Meissner | 361/679.5 |
| 2004/0094289 A1 * | 5/2004 | Harshberger et al. | 165/48.1 |
| 2005/0087329 A1 | 4/2005 | Zhang et al. | |
| 2006/0037953 A1 | 2/2006 | Matthews | |
| 2007/0209383 A1 | 9/2007 | Hutton | |
| 2008/0307813 A1 | 12/2008 | Lifson et al. | |
| 2009/0084120 A1 | 4/2009 | Meier | |
| 2009/0107159 A1 | 4/2009 | Mann, III et al. | |
| 2009/0107160 A1 | 4/2009 | Montminy et al. | |
| 2009/0107657 A1 | 4/2009 | Montminy et al. | |
| 2009/0108549 A1 | 4/2009 | Montminy et al. | |
| 2009/0108552 A1 | 4/2009 | Mann, III et al. | |
| 2009/0110471 A1 | 4/2009 | Montminy et al. | |
| 2009/0112368 A1 | 4/2009 | Mann, III et al. | |
| 2009/0121552 A1 | 5/2009 | Mann, III et al. | |
| 2010/0132390 A1 | 6/2010 | Platt et al. | |

FOREIGN PATENT DOCUMENTS

| | | |
|---|---|---|
| CN | 101351383 | 1/2009 |
| DE | 20313048 U1 | 2/2004 |
| GB | 1276454 A | 6/1972 |
| JP | 1189435 | 7/1989 |
| JP | 2000198349 | 7/2000 |
| WO | 2007061622 A1 | 5/2007 |

OTHER PUBLICATIONS

International Search Report for application No. PCT/US2010/056817 mailed Feb. 21, 2011.

International Search Report for application No. PCT/US2010/056854 mailed Feb. 21, 2011.

International Search Report for application No. PCT/US201/022139 mailed Apr. 29, 2011.

International Search Report for application No. PCT/US2011/052001 and PCT Written Opinion mailed Dec. 27, 2011.

* cited by examiner

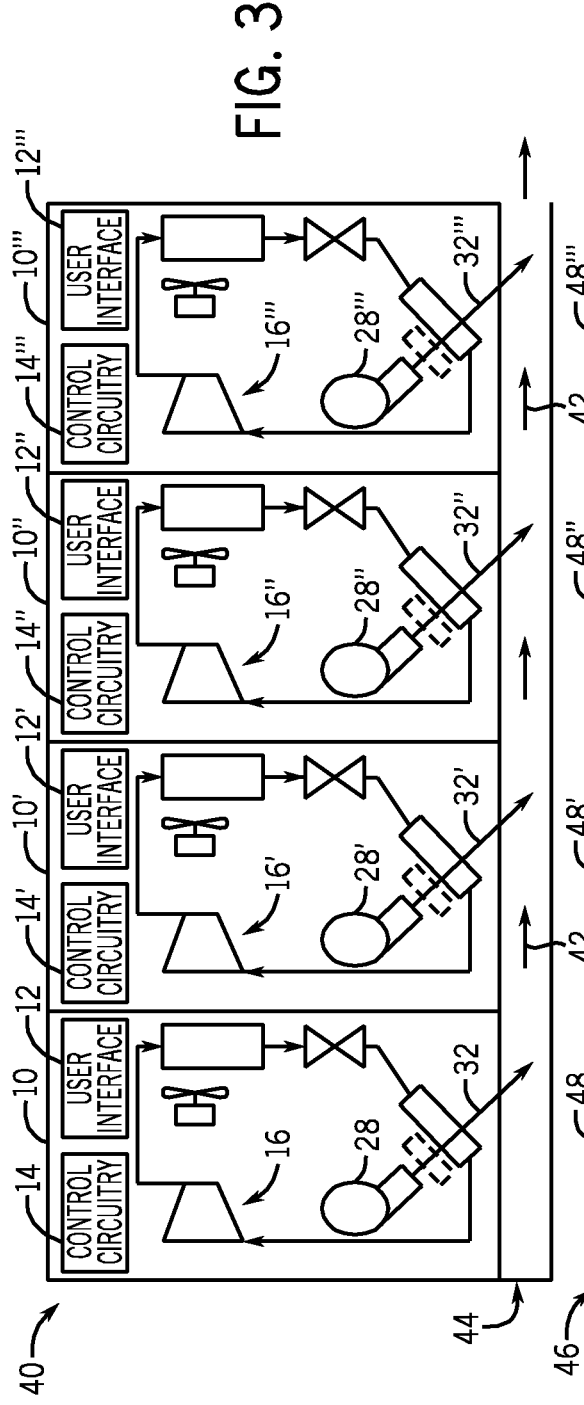
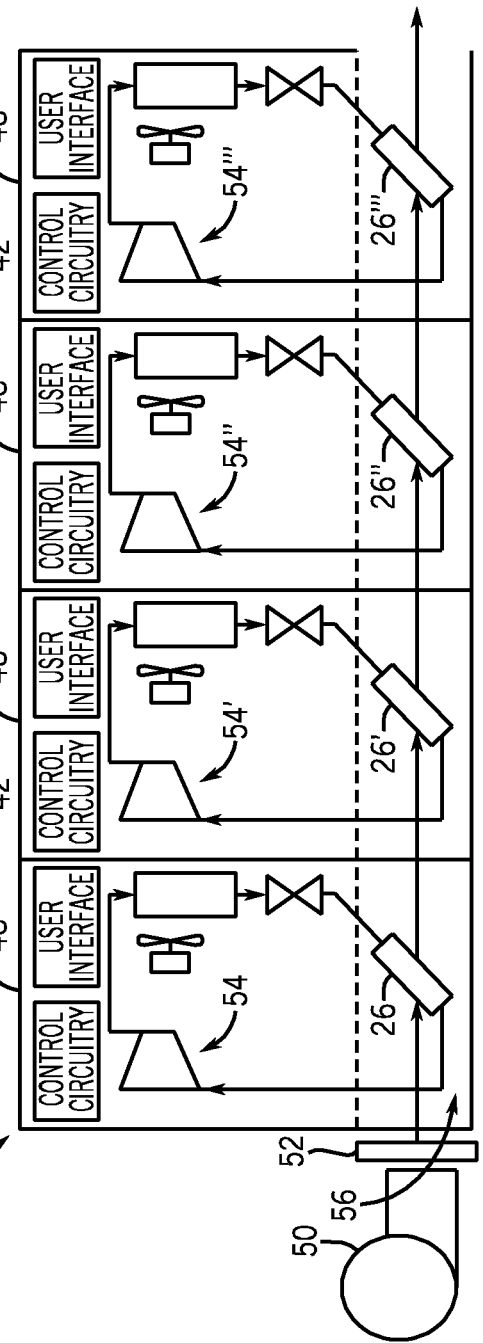

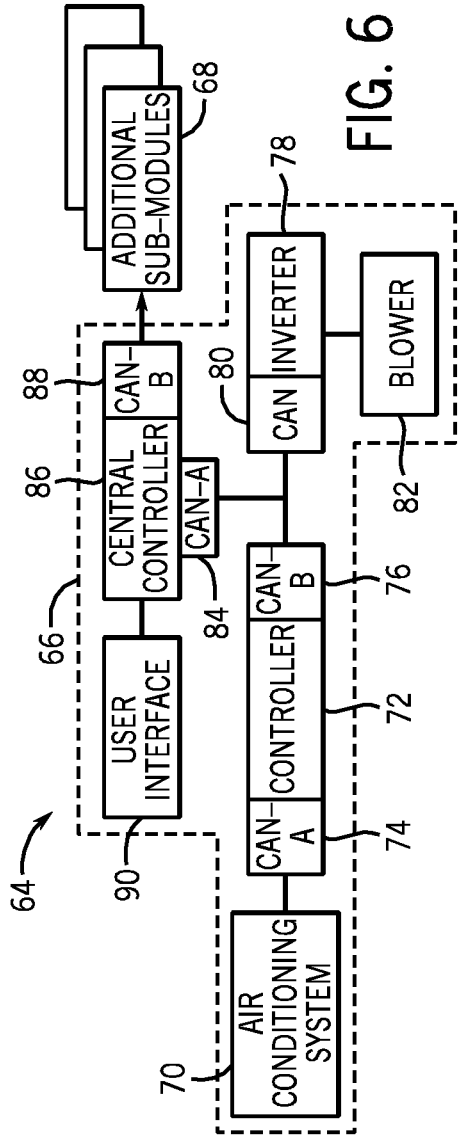
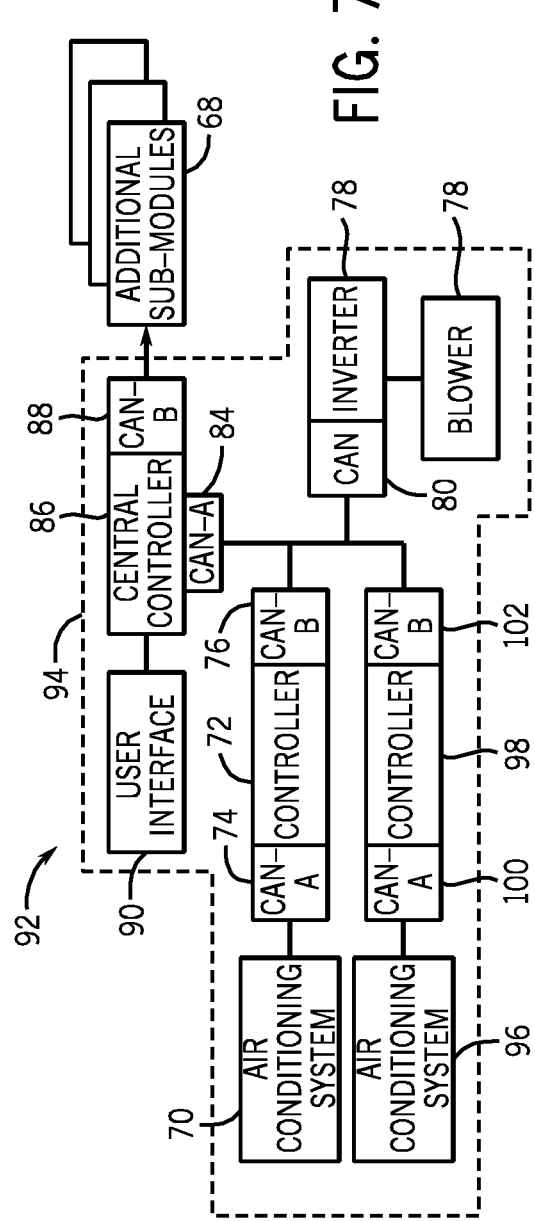

MODULAR HEATING, VENTILATING, AIR CONDITIONING, AND REFRIGERATION SYSTEMS AND METHODS

CROSS REFERENCE TO RELATED APPLICATIONS

This application is a Non-Provisional patent application of U.S. Provisional Patent Application No. 61/184,470, entitled "Sub-Module Air Conditioning System for Ground Support Equipment Utilizing Sumpless Compressors", filed Jun. 5, 2009, which is herein incorporated by reference.

BACKGROUND

The invention relates generally to heating, ventilation, air conditioning, and refrigeration (HVACR) systems, and, more particularly, to modular HVACR systems.

HVACR systems are utilized for a variety of applications that require the temperature and quality of surrounding air to be regulated. For example, HVACR systems are utilized to provide ventilation, filter air, and maintain desirable pressure relationships for buildings, aircraft, and so forth. As such, HVACR systems typically include a refrigeration cycle with a variety of internal components that cooperatively function to output the desired air stream. Unfortunately, in many traditional systems, if a single internal component malfunctions, the entire HVACR system must be shut down until the malfunction is fixed or a broken part is replaced. In some industries, such a situation may result in lost productivity due to the resulting downtime. Accordingly, there exists a need for improved HVACR systems that overcome such a drawback.

BRIEF DESCRIPTION

In an embodiment, a modular air conditioning (AC) system includes an AC module. The AC module includes a refrigeration system adapted to circulate a refrigerant to produce a conditioned air stream. The AC module is adapted to couple to at least one other, self-similar AC module, to bidirectionally communicate with one other AC module, and to selectively operate either collectively with the other AC module or as a standalone unit without the other AC module.

In another embodiment, a modular air conditioning (AC) system includes a first AC module including a first internal data bus adapted to bidirectionally exchange data between the first AC module and a central control circuit. The first AC module is adapted to cooperatively function with one or more additional AC modules to produce a conditioned air stream. The modular AC system also includes a second AC module including a second internal data bus connection adapted to bidirectionally exchange data between the second AC module and the central control circuit. The second AC module is further adapted to cooperatively function with the first AC module to produce the conditioned air stream.

In another embodiment, a modular air conditioning (AC) system includes a first AC module including a first refrigeration system adapted to operate collectively with at least one additional AC module to produce a conditioned air stream. The modular air conditioning system also includes a second AC module including a second refrigeration system adapted to collectively operate with the first AC module to produce the conditioned air stream. The modular AC system also includes a blower adapted to intake surrounding air and provide an air source for the first AC module and the second AC module.

DRAWINGS

These and other features, aspects, and advantages of the present invention will become better understood when the following detailed description is read with reference to the accompanying drawings in which like characters represent like parts throughout the drawings, wherein:

FIG. 3 illustrates a modular AC system including multiple AC modules that collectively produce conditioned air in accordance with aspects of the present invention;

FIG. 4 illustrates a modular AC system including multiple AC modules that utilize a single blower in accordance with aspects of the present invention;

FIG. 6 is a block diagram illustrating an exemplary control system that may be used to operate a modular AC system in accordance with aspects of the present invention;

FIG. 7 is a block diagram illustrating another exemplary control system that may be used to operate a modular AC system in accordance with aspects of the present invention.

DETAILED DESCRIPTION

As described in detail below, embodiments of a modular air conditioning system are provided. The modular AC system may include one or more AC modules that are adapted to function individually or cooperatively as desired by an operator. As such, presently contemplated embodiments of the AC modules may be configured to function together in a variety of system configurations. For example, the AC modules may each include a separate blower, and each blower may be configured to output conditioned air into a common manifold used to supply a single stream of conditioned air for a downstream application, such as cooling or heating of an aircraft when on the ground. For further example, the AC system may include a single blower adapted to support multiple AC modules. Still further, the AC modules may be configured for easy stacking such that the modular AC system may be used in applications with space constraints. Indeed, the modularity of the disclosed modular AC systems may offer advantages over traditional non-modular AC systems. For example, the modularity of the AC system may allow for increased system efficiency and responsiveness as well as decreased system downtime as compared to non-modular AC systems. Such modularity may be based upon use of self-similar modules that can be used alone or associated with one another in various combinations. The combinations may provide redundancy, accommodate temporary or longer-term changing capacity needs (lower or higher), and may allow for field-changeable configurations, such as to provide a single output air stream, separate air streams, or both at different locations or times, depending upon the application needs.

The resulting systems may be used in a wide range of applications, but are particularly well suited to temporarily supplying conditioned air to aircraft and other non-permanent installations. Such installations may include, for example, temporary, modular, or other field applications, such as field hospitals, emergency response tents and buildings, disaster sites (e.g., in temporary or damaged buildings) and so forth. While the modular systems described below are not presented as specifically including their own dedicated power sources, they may draw power from the power grid, when available, but may also be provided with power from generators (e.g., engine-driven equipment) and other power sources, particularly in the case of field operations and disaster response.

Figure 1:
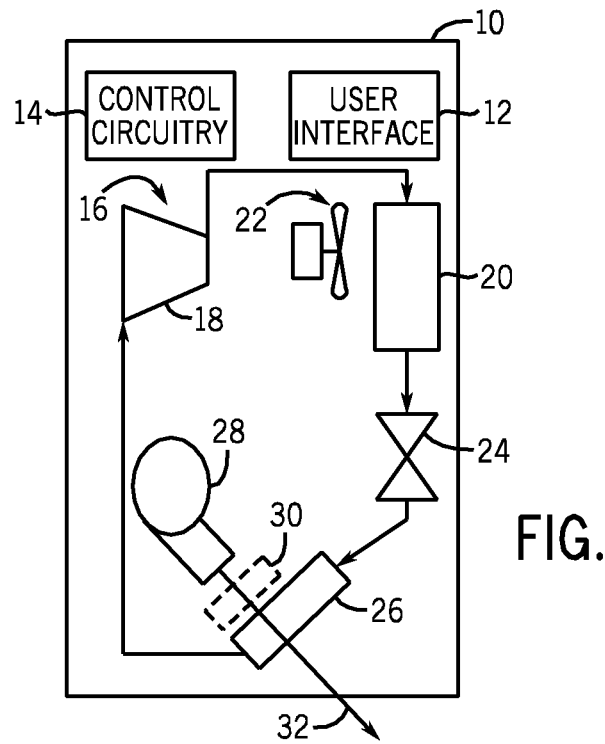
FIG. 1 illustrates an exemplary AC module that is adapted to function both as a standalone unit and as a module in a multi-module system that collectively produces conditioned air in accordance with aspects of the present invention.

Turning now to the drawings, FIG. 1 illustrates an exemplary AC module 10 that is adapted to both function on its own to produce conditioned air and couple to additional air conditioning modules as a unit in a multi-module system that collectively produces cooled air. Accordingly, it should be noted that the module 10 may be coupled to any other number of modules adapted to cooperatively function as a single system. As such, the air conditioning module 10 includes a user interface 12, which may be activated when the module 10 is used in isolation. The same interface may remain active when the module is part of a multi-module system, or it may be deactivated or configured to allow the module to behave in the system as a master or slave mode. Through the user interface 12, an operator may input desired settings, turn the module on and off, and so forth. Furthermore, if the module is utilized as part of a multi-module AC system, the user interface 12 may include controls that enable the operator to facilitate the coordination of the modules and selectively activate or deactivate the user interfaces located on each of the modules.

The AC module 10 also includes control circuitry 14 that facilitates the operation of the internal components of the module 10 and, if appropriate, interfaces with the control circuitry of one or more additional modules to ensure the module 10 functions cooperatively with the other modules in the system. Still further, the AC module 10 includes a refrigeration system 16 that is adapted to produce conditioned air. In the illustrated embodiment, the refrigeration system 16 utilizes a vapor-compression cycle to generate the conditioned air. However, it should be noted that the refrigeration system 16 may employ any of a variety of suitable refrigeration systems or techniques that are well known in the art to generate conditioned air.

In the illustrated embodiment, the refrigeration system 16 includes a compressor 16, a condenser 20, a condenser fan 22, an expansion valve 24, an evaporator 26, a blower 28, and an (optional) intercooler 30, interconnected to carry out a refrigeration cycle. During operation, a refrigerant flows through the refrigeration system 16, which produces conditioned air that is expelled from the AC module 10, as indicated by arrow 32. For example, one exemplary refrigerant path is shown by the arrows in FIG. 1. In such a path, the vaporized refrigerant enters the compressor 16 where it is compressed at generally constant entropy to form a compressed vaporized refrigerant. The resulting refrigerant enters the condenser 20, which removes heat and condenses the vaporized refrigerant into a liquid. The liquid refrigerant then enters the expansion valve 24, which decreases the pressure of the liquid refrigerant. The refrigerant then flows through coils of the evaporator 26. While flowing through the evaporator 26, the refrigerant is vaporized, absorbing heat due to the latent heat of fusion, and cools the ambient air moved over the evaporator coils by the blower 28, which air may be directed through the intercooler 30 (to remove at least some of the thermodynamic work imparted by the blower). The vaporized refrigerant exits the evaporator 26 and enters the compressor 18 to continue the cycle. As will be appreciated by those skilled in the art, the evaporator may perform some superheating of the gaseous phase refrigerant, and the condenser may perform some subcooling of the liquid phase refrigerant.

The illustrated refrigeration system 16 relies on the fan 22 to blow air away from the condenser 20 for heat rejection during operation. It should be noted that the fan may blow the air in any direction suitable for the hot air to be expelled from the module 10 (e.g., through ventilation louvers, openings, and so forth). Moreover, although the intercooler 30 is shown as a single unit, the intercooler 30 may include multiple components, such as an additional fan or blower that directs the ambient air over the outside of the intercooler 30.

It should be noted that, as mentioned above, the AC module 10 of FIG. 1 is envisioned for use in any modular AC system that may be used in multiple applications. For instance, the module 10 may be utilized in an aircraft ground delivery cart that supplies a grounded aircraft with conditioned air. In such applications, the modular AC system may be adapted to respond to a variety of external conditions. For example, if the air temperature becomes elevated during use, the modular AC system may trigger the output of conditioned air from additional units. In this way, when functioning as a modular AC system on a ground support equipment cart, the AC system may be adaptive to the conditions present at the location of the unit. The foregoing feature of some embodiments may offer distinct advantages over traditional non-modular AC systems since two modules operating at half capacity may be more efficient than a single unit operating at maximum capacity. Indeed, the disclosed AC modules described herein may be used in any application that requires a conditioned air supply. Thus, as discussed below, various control schemes may be implemented to make best use of two of more such modules operating in conjunction.

Figure 2:
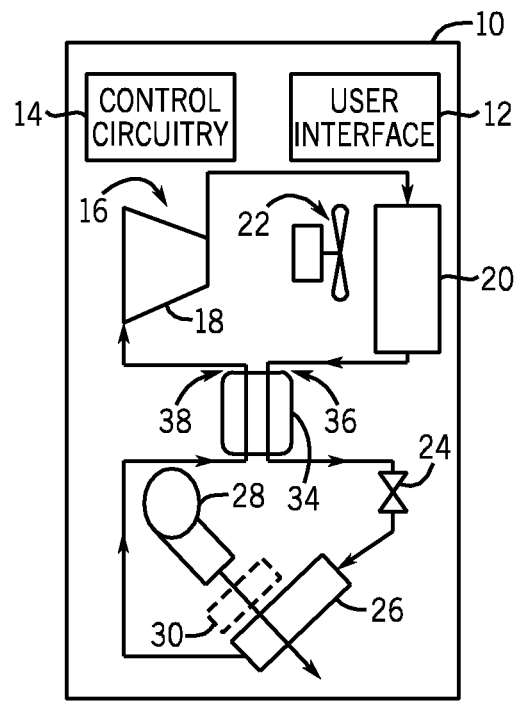
FIG. 2 illustrates an exemplary AC module that includes a heat exchanger in accordance with aspects of the present invention.

FIG. 2 illustrates an alternate embodiment of the AC module 10 including a heat exchanger 34 that is provided to exchange energy between the cool vaporized refrigerant that exits a evaporator 26 and the warm liquid refrigerant that exits a condenser 20. Accordingly, the refrigeration system 16 in the module 10 of FIG. 2 includes a compressor 18, a condenser 20, a condenser fan 22, a heat exchanger 34, an expansion valve 24, an evaporator 26, an intercooler 30, and a blower 28. During operation, the heat exchanger 34 may be adapted to function as a liquid to vapor heat transfer device (e.g., in parallel or counterflow modes). That is, in this embodiment, the warm liquid refrigerant leaving the condenser 20 is the source of a heat that is transferred to the cool vaporized refrigerant leaving the evaporator 26. Furthermore, the side of the heat exchanger through which the vaporized refrigerant from the evaporator 26 flows may serve as an accumulator for refrigerant during certain periods of operation of the system. In operation, then, the heat exchanger may reduce or eliminate the possibility of any liquid refrigerant reaching the compressor 18.

Thus, in the embodiment of FIG. 2, the vaporized refrigerant flows through the compressor 18 and into the condenser 20, as before. However, in this embodiment, the warm liquid exiting the condenser 20 enters a first side 36 of the heat exchanger 34. As the liquid flows through the heat exchanger 34, the refrigerant is cooled (or subcooled), thus increasing the refrigeration capacity of the module and reducing or eliminating the possibility of the refrigerant flashing prior to reaching the expansion valve 24. The refrigerant then flows through the expansion valve 24 and the evaporator 26, as before. The air from the blower 28 concurrently flows through the intercooler 30 and the evaporator 26, thus producing conditioned air. After exiting the evaporator 26, the vapor-liquid refrigerant flows through a second side 38 of the heat exchanger 34. The heat exchanger 34 warms the refrigerant and removes any residual liquid (or performs superheating), thus outputting a substantially fully vaporized refrigerant for re-entry into the compressor.

FIG. 3 illustrates an embodiment of an exemplary modular AC system 40. The modular system 40 includes the AC module 10 of FIG. 1 coupled to additional AC modules 10', 10", 10'''. Although four AC modules are illustrated, it should be noted that any number of modules suitable for a given application may be coupled together in the modular system 40. In the illustrated embodiment, each module 10, 10', 10", 10''' includes a distinct refrigeration system 16, 16', 16", 16''' that includes a separate blower 28, 28', 28", 28'''. Each AC module 10, 10', 10", 10''' generates a separate stream of conditioned air 32, 32', 32", 32''' that converges with the other streams to form a single stream 42 of conditioned air in a manifold 44 located below the AC modules. That is, the AC modules of the modular system 40 are configured to cooperatively function to output the conditioned air 42 for a downstream application.

In certain embodiments, the modular system 40 may be configured to be controlled via the user interface 12 on the AC module 10. That is, the user interface 12 may be used to control the operation of the entire modular system 40. In such embodiments, the user interfaces 12', 12", 12''' may be inactivated during operation (or configured to follow commands or settings input via interface 12). In this way, the AC module 10 may be the "master" controller for the system 40, and the AC modules 10', 10", and 10''' may be the "slaves" of the system 40. Such an arrangement may facilitate the cooperative functioning of the modules via the control circuitry 14, 14', 14", 14''' located in each module. Still further, in other embodiments, any one of the user interfaces on any of the modules may function as the "master", thus inactivating the remaining user interfaces and forcing the corresponding AC modules to function as "slaves" during use. Indeed, any user interface on any module in the system 40 may be designated as the "master" for controlling purposes.

The modularity of the modular system 40 may offer a variety of distinct advantages over non-modular AC systems. For example, the modular system 40 may be adaptable for efficient use in many applications due to its versatility. Specifically, the modular system may easily scale back or increase the output of conditioned air since the system may selectively use some or all of the AC modules. This feature may offer benefits in situations in which one module malfunctions. For instance, if the system is operating below maximum capacity and a single module malfunctions, the malfunctioning module may be shut down, and another module may be activated to replace the output of the out-of-service module. Additionally, since the modules may be selectively activated and deactivated, one or more modules may be shut down for replacement or repair of components while the system maintains the desired air output. Still further, the modular system enables the controller to activate the modules at a variety of capacity levels. This feature may allow for each module to operate at half (or some fractional) capacity instead of one or more of the modules operating at full capacity, thus increasing the efficiency of some systems. Indeed, presently contemplated embodiments of the modular system 40 enable a variety of advantageous control schemes to be implemented.

FIG. 4 illustrates another embodiment of a modular AC system 46. The modular AC system 46 includes modules 48, 48', 48", and 48'''. However, in further embodiments, the AC system 46 may include any number of modules suitable for the given application. In the illustrated embodiment, the system 46 includes a single blower 50 and a single intercooler 52 that are sized at a capacity sufficient to support the functioning of all the modules in the system 46. That is, in the illustrated embodiment, the blower 50 and the intercooler 52 are sufficient to support the operation of up to four modules 48. As such, the refrigeration systems 54, 54', 54", and 54''' of this embodiment do not include individual blowers and intercoolers as in the embodiments of FIGS. 1-3.

Furthermore, in the illustrated embodiment, the modular system 46 includes a common manifold 56 into which every module outputs conditioned air. The embodiment shown includes the evaporators 26, 26', 26", 26''' positioned inside (or more generally, in fluid communication with) the manifold 56. However, in further embodiments, the evaporators may be adapted to blow conditioned air into the manifold 56 but may not be located in the manifold 56. As before, the modular system 46 may be controlled via a single user interface located on any one of the modules or each module may be individually controlled through separate interfaces.

It should be noted that the modular units disclosed herein may be adapted to provide a variety of suitable types of conditioned air. For example, the modules may be configured to intake substantially ambient or warm air and output substantially cooler air. In such embodiments, the modular units may be configured to operate as air cooling units. For further example, the modules may be configured to intake substantially ambient or cool air and output substantially warmer or hotter air. In such cases, the modules may be adapted to function as air warming units. Indeed, a single modular unit may be configured to selectively operate as an air cooling unit in one instance and as an air warming unit in another instance. Similarly, the modular systems disclosed herein may be configured to operate as air cooling units, air heating units, or a combination thereof.

Furthermore, the byproducts of the refrigeration cycle, such as water, may be collected and recycled for other uses if desired. As will be appreciated by those skilled in the art, substantially liquid water condensate may be extracted by the surrounding air as the air is cooled, even when ambient dew points are quite low. In field operations (e.g., mobile hospitals, disaster relief installations, etc.), this water may be quite valuable, and it is contemplated that one or more condensate collection trays, recipients and the like may be positioned below the evaporator(s) to collect this water.

Figure 5:
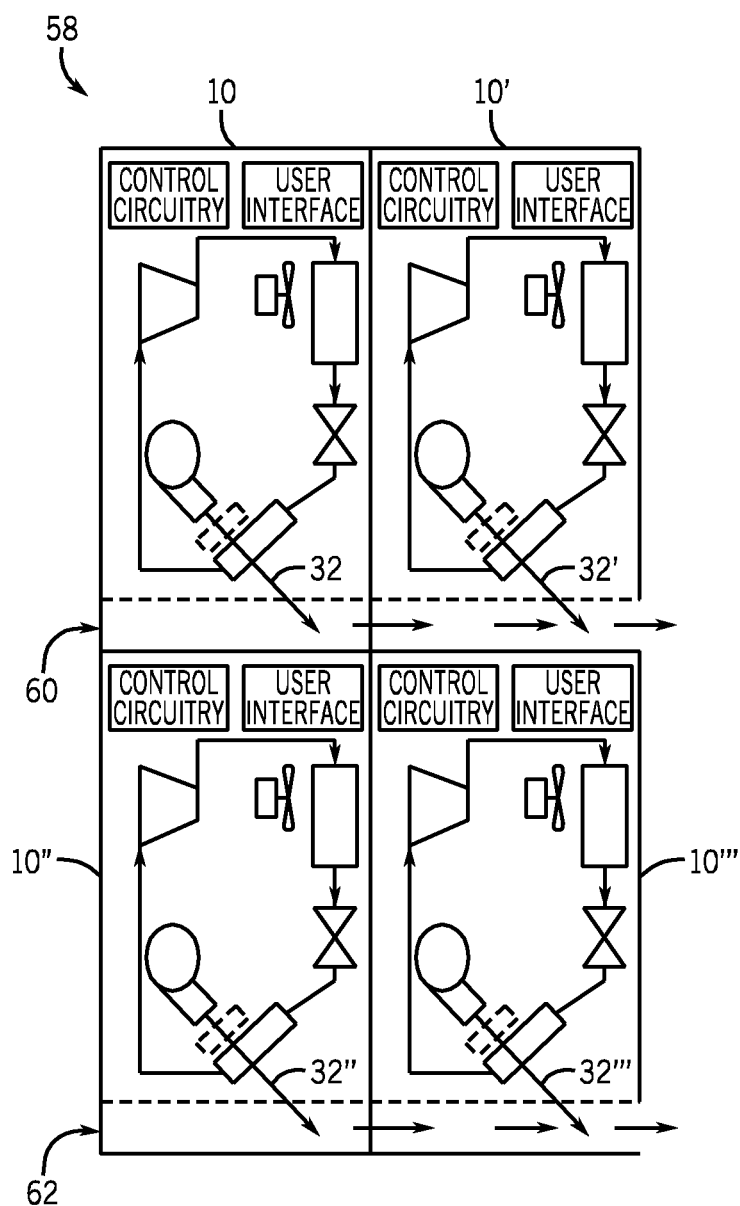
FIG. 5 illustrates a modular AC system with multiple AC modules arranged in a stacked configuration in accordance with aspects of the present invention.

FIG. 5 illustrates another embodiment of a modular AC system 58 that includes the modules 10, 10', 10", and 10''' of FIG. 3 arranged in a different manner. In this embodiment, the modules are stacked with respect to one another such that modules 10 and 10' output conditioned air 32 and 32' into a first manifold 60 and modules 10" and 10''' output conditioned air 32" and 32''' into a second manifold 62. Although not shown, some embodiments may include another manifold into which the air in the first manifold 60 and the air in the second manifold 62 converge. Such stacked arrangements of the modules may offer advantages in applications with space constraints. For example, there may be limited space for AC systems needed for use in portable hospitals or examination tents. In such applications, it may be advantageous to stack or otherwise closely align the AC modules, thus utilizing the vertical space above the AC modules. Any number of modules may be stacked on top of any other number of modules (e.g., 2×2, 3×3, 3×2, etc.) as suitable for the desired application. Air handling conduits in connection with the manifold(s) may be field-configurable to allow the flow to be selectively combined and separated depending upon the application needs.

FIG. 6 is a block diagram illustrating an exemplary control system 64 that may be used to operate a modular AC system as disclosed herein. In the illustrated embodiment, the control system 64 may include a sub-module 66 that communicates both within the sub-module and with additional sub-modules via controller area network (CAN) communication. The sub-module 66 includes an air conditioning system 70 coupled to a system controller 72 with a first bus (CAN-A) 74 and a second bus (CAN-B) 76. The sub-module 66 also includes an inverter 78 with a bus (CAN) 80 coupled to a blower 82. The inverter 78 and the system controller 72 are coupled to a first bus (CAN-A) 84 of a central controller 86. The central controller 86 also includes a second bus (CAN-B) 88 that couples the central controller to the additional sub-modules 68. The sub-module 66 further includes a user interface 90 coupled to the central controller 86.

During operation, the air conditioning system sends data to and receives data from the first bus 74 of the system controller 72. The system controller 72 transmits data regarding the operation of the air conditioning system 70 to the central controller via the bus 84. Concurrently, the inverter may send data via the bus 80 to the bus 84 of the central controller 86. The central controller 86 receives data via the bus 84 in a prioritized order in which the less critical system information is received and processed after the critical information. Also, the system operator may input information via the user interface 90 that may be used to reprogram or override system commands. In this way, the central controller 86 may interface both with internal components of the sub-module 66 as well as separate sub-modules 68 to coordinate operation of the system 64. As such, the central controller 86 may be configured to function as the "master" controller of the system 64, outputting command signals for all the sub-modules or as a "slave" controller, receiving and implementing the commands from another central controller.

FIG. 7 is a block diagram illustrating an alternate exemplary control system 92 that may be used to operate a modular AC system as disclosed herein. In this embodiment, a sub-module 94 includes an additional air conditioning system 96 coupled to an additional system controller 98 via a first bus (CAN-A) 100 with respect to FIG. 6. The second system controller 98 also includes a second bus (CAN-B) 102, through which the system controller 98 bidirectionally communicates with the first bus 84 of the central controller 86. In this embodiment, the central controller 86 interfaces both the first air conditioning system 70 and the second air conditioning system 96 of the sub-module 94 with the air conditioning system(s) of the additional sub-modules 68. Indeed, it should be noted that each sub-module 94 may include one or more air conditioning systems as suitable for the given application.

Figure 8:
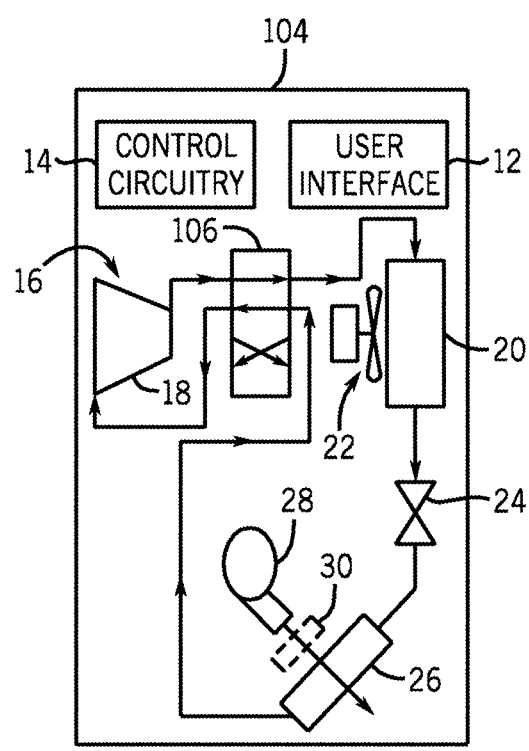
FIG. 8 illustrates an exemplary AC module that includes a reversing valve for enabling a heat pump mode in accordance with aspects of the present invention.

FIG. 8 illustrates a further embodiment of an alternate AC module 104 in accordance with aspects of the present invention. In this embodiment, the module 104 includes the control circuitry 14, the user interface 12, and the refrigeration system 16. The refrigeration system includes the compressor 18, the condenser 20, the expansion valve 24, the evaporator 26, the intercooler 30, and the blower 28, as before. However, the embodiment of FIG. 8 also includes a reversing valve 106 adapted to alter the flow of the refrigerant through the refrigeration system 16 during operation, thus configuring the module 104 as either a refrigerated air system that outputs cooled air or as a heat pump that outputs heated air.

In the illustrated embodiment, the refrigeration system 16 is configured for use as an air cooling system. That is, refrigerant exiting the compressor travels through the reversing valve 106 but is not reversed before entering the condenser 20. Similarly, the refrigerant exiting the evaporator 26 enters the reversing valve 106 but continues through the valve 106 to enter the condenser 18 as before. However, in heat pump mode, the reversing valve 106 may be repositioned such that the refrigerant flow from the condenser 18 is reversed in the reversing valve 106 and redirected to enter the evaporator 26. However, in such embodiments, the evaporator 26 is configured to function as a condenser. After traveling through the evaporator functioning as a condenser, the refrigerant flows through the expansion valve 24 and enters the condenser 20, which functions as an evaporator. The refrigerant then flows through the reversing valve 106, which directs the flow back to the entrance of the compressor. As such, the module 104 may be configured to output either cooled air or warmed air depending on the position of the reversing valve 106. A modular system of this type may be used in any or all of the configurations described above.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A modular air conditioning (AC) system, comprising:
an AC module comprising a refrigeration system adapted to circulate a refrigerant to produce a conditioned air stream, wherein the AC module is configured to couple to at least one other, self-similar AC module in a stacked arrangement, to bidirectionally communicate with the at least one other, self-similar AC module, and to selectively operate either collectively with the at least one other, self-similar AC module or as a standalone unit without the at least one other, self-similar AC module;
wherein the AC module comprises a manifold configured to connect to a mating manifold of the at least one other, self-similar AC module such that air flow is blown from a single common blower through the manifold of the AC module and the mating manifold of the at least one other, self-similar AC module.

2. The modular AC system of claim 1, wherein the AC module comprises control circuitry configured to control operation of the AC module when operating as a standalone unit and to control operation of the AC module and the at least one other, self-similar AC module when operating collectively.

3. The modular AC system of claim 1, wherein the AC module comprises a heat exchanger configured to function as a liquid to vapor heat transfer device.

4. The modular AC system of claim 3, wherein the heat exchanger is configured to exchange energy between a cool vaporized refrigerant exiting an evaporator and a warm liquid refrigerant exiting a condenser.

5. The modular AC system of claim 4, wherein the evaporator is disposed in the manifold of the AC module such that the air flow from the single common blower is directed across the evaporator.

6. The modular AC system of claim 5, wherein a second evaporator is disposed in the mating manifold of the at least one other, self-similar AC module such that the air flow from the single common blower is directed across the evaporator in the manifold and the second evaporator in the mating manifold.

7. The modular AC system of claim 1, wherein the AC module communicates with the at least one other, self-similar AC module via controller area network (CAN) communication.

8. The modular AC system of claim 1, wherein the manifold of the AC module does not comprise the single common blower.

9. A modular air conditioning (AC) system, comprising:
a first AC module comprising a first internal data bus configured to bidirectionally exchange data between the first AC module and a central control circuit;
one or more additional AC modules comprising one or more additional internal data bus connections configured to bidirectionally exchange data between the one or more additional AC modules and the central control circuit, wherein the one or more additional AC modules is configured to cooperatively function with the first AC module to produce a conditioned air stream; and
a single blower sized at a capacity sufficient to support the first AC module and the one or more additional AC modules and configured to blow surrounding air through the first AC module and the one or more additional AC modules,
wherein the first AC module comprises a manifold configured to couple to a mating manifold of the one or more additional AC modules such that the surrounding air is blown through the first AC module and the one or more additional AC modules.

10. The modular AC system of claim 9, wherein the central control circuit is configured to control operation of the single blower to scale back or increase the conditioned air stream.

11. The modular AC system of claim 9, wherein the first AC module comprises a first user interface, the one or more additional AC modules comprise one or more additional user interfaces, and the central control circuit is configured to designate one of the first user interface and the one or more additional user interfaces as a master interface and the others of the first user interface and the one or more additional user interfaces as slave interfaces.

12. The modular AC system of claim 11, wherein the master interface is configured to enable an operator to control operation of the first AC module and the one or more additional user interfaces.

13. The modular AC system of claim 9, wherein the first AC module communicates with the one or more additional AC modules via controller area network (CAN) communication.

14. The modular AC system of claim 9, wherein at least one of the first AC module and the one or more additional AC modules comprises a reversing valve configured to selectively reverse a function of the at least one AC module between a refrigeration mode producing cooled air and a heat pump mode producing warmed air.

15. The modular AC system of claim 9, wherein at least one of the first AC module and the one or more additional AC modules comprises a heat exchanger configured to function as a liquid to vapor heat transfer device.

16. A modular air conditioning (AC) system, comprising:
a first AC module comprising a first refrigeration system configured to operate collectively with at least one additional AC module to produce a conditioned air stream;
a second AC module comprising a second refrigeration system configured to collectively operate with the first AC module to produce the conditioned air stream; and
a blower configured to intake surrounding air and blow the surrounding air through the first AC module and the second AC module,
wherein the first AC module comprises a first manifold, the second AC module comprises a second manifold, and the first and second manifolds are coupled to one another such that the surrounding air is blown through the first AC module and the second AC module.

17. The modular AC system of claim 16, wherein the first AC module comprises a first user interface, the second AC module comprises a second user interface, and a controller is configured to designate one of the first user interface and the second user interface as a master interface and the other of the first user interface and the second user interface as a slave interface.

18. The modular AC system of claim 16, wherein the first AC module communicates with the second AC module via controller area network (CAN) communication.

19. The modular AC system of claim 16, wherein the first AC module and the second AC module each output conditioned air into a common manifold to form the conditioned air stream.

20. The modular AC system of claim 19, wherein an evaporator of the first AC module and a second evaporator of the second AC module are both located in the common manifold.

* * * * *